(12) United States Patent
Smirnov et al.

(10) Patent No.: US 8,212,459 B2
(45) Date of Patent: Jul. 3, 2012

(54) MOTOR

(75) Inventors: Viatcheslav Smirnov, Suwon-si (KR);
Ho-Jun Yoo, Suwon-si (KR); Nam-Seok Kim, Osan-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 373 days.

(21) Appl. No.: 12/613,155

(22) Filed: Nov. 5, 2009

(65) Prior Publication Data
US 2010/0289385 A1 Nov. 18, 2010

(30) Foreign Application Priority Data

May 15, 2009 (KR) .................. 10-2009-0042693

(51) Int. Cl.
*H02K 7/08* (2006.01)
*H02K 5/167* (2006.01)

(52) U.S. Cl. ...... 310/425; 310/67 R; 310/90; 360/99.08; 720/695; 720/698

(58) Field of Classification Search ............ 310/40 MM, 310/67 R, 90, 91, 418, 425; 384/192, 193, 384/226, 227, 228, 271, 276, 279, 268; 360/98.04, 360/98.07, 99.08; 720/965–698
See application file for complete search history.

(56) References Cited

U.S. PATENT DOCUMENTS

| | | | | |
|---|---|---|---|---|
| 5,942,823 A * | 8/1999 | Higuchi et al. | ................. | 310/90 |
| 6,246,140 B1 * | 6/2001 | Horng | ............................ | 310/91 |
| 6,720,694 B2 * | 4/2004 | Horng et al. | .................... | 310/90 |
| 6,847,141 B2 * | 1/2005 | Wang | ................................ | 310/91 |
| 6,882,074 B2 * | 4/2005 | Horng et al. | .................... | 310/90 |
| 7,015,610 B2 * | 3/2006 | Horng et al. | .................... | 310/90 |
| 7,109,620 B2 * | 9/2006 | Fujii et al. | ....................... | 310/90 |
| 8,143,761 B2 * | 3/2012 | Hong | ..................... | 310/216.113 |
| 2004/0189113 A1* | 9/2004 | Kuribara | ..................... | 310/67 R |
| 2008/0007127 A1* | 1/2008 | Hong et al. | ..................... | 310/51 |

* cited by examiner

*Primary Examiner* — Tran Nguyen
(74) *Attorney, Agent, or Firm* — McDermott Will & Emery LLP

(57) ABSTRACT

A motor is disclosed. The motor can include: a rotor equipped with a shaft; a base, in which a housing hole is formed and which includes a housing support portion protruding along a periphery of the housing hole; a housing, which may be inserted in the housing hole to be supported by the housing support portion and in which a through-hole is formed so that the shaft may be inserted in one side of the through-hole; and a rotor support, which may be inserted into the other side of the through-hole and in which a support indentation is formed to rotatably support the shaft. This motor can be manufactured by a simple process at a low manufacturing cost.

9 Claims, 4 Drawing Sheets

MOTOR

CROSS-REFERENCE TO RELATED APPLICATIONS

This application claims the benefit of Korean Patent Application No. 10-2009-0042693, filed with the Korean Intellectual Property Office on May 15, 2009, the disclosure of which is incorporated herein by reference in its entirety.

BACKGROUND

1. Technical Field

The present invention relates to a motor.

2. Description of the Related Art

Spindle motors are widely used in electronic products such as computer CD drives that require high-precision rotations. Despite its small size, the spindle motor allows high-speed rotations and precision control, as well as low power consumption, and because of these benefits, the use of the spindle motor is expected to increase continuously.

A typical spindle motor includes a rotor and a stator, which supports the rotational movement of the rotor.

A spindle motor according to the related art may be structured to have the rotor rotatably supported on the stator that includes a housing coupled to a base plate by way of caulking.

The manufacture of the spindle motor may include processing the housing with high-strength brass in order to accurately align the centers of the stator and the rotor. This, however, may be one of the factors that increase costs.

Also, the operation of coupling the housing to the base plate by caulking the lower surface of the housing can entail inconvenient processes. In addition, there is a risk of misalignment between the centers of the stator and the rotor occurring during the caulking process.

To resolve these drawbacks, a structure of inserting a cup-shaped housing into the base plate has been proposed, with the shaft of the rotor inserted in the cup-shaped housing. In this arrangement, however, the shaft may be subject to tilting, when the housing coupled to the base plate is tilted. Also, the sizing operation, for modifying the inner diameter of a bearing fitted into the housing, can be more difficult.

SUMMARY

An aspect of the invention provides a motor that can be manufactured by a simple process at a low cost.

Another aspect of the invention provides a motor in which the shaft is prevented from tilting and in which the sizing operation for the inner diameter of the bearing is facilitated.

Yet another aspect of the invention provides a motor that includes: a rotor equipped with a shaft; a base, in which a housing hole is formed and which includes a housing support portion protruding along a periphery of the housing hole; a housing, which may be inserted in the housing hole to be supported by the housing support portion and in which a through-hole is formed so that the shaft may be inserted in one side of the through-hole; and a rotor support, which may be inserted into the other side of the through-hole and in which a support indentation is formed to rotatably support the shaft.

The housing and the housing support portion can have a fit tolerance, and the housing can be coupled to the base by a press fit.

The housing support portion can protrude from one side of the base, and the housing can include a flange being in contact with the other side of the base.

A base curb portion having a larger inner diameter can be formed in the housing hole to hold the flange.

An adhesive can be included between the housing and the base.

An exterior curb portion having a smaller outer diameter can be formed on a perimeter of the housing, while the motor can further include an electromagnet that is supported by the exterior curb portion.

The rotor support and the through-hole in the housing can have a fit tolerance, and the rotor support can be coupled to the housing by a press fit.

A support surface can be formed on the rotor support along a periphery of the support indentation, and the motor can further include a stopper, which may rest on the support surface and which may be coupled to the shaft, to prevent the shaft from becoming detached.

The rotor support can be a flat element that includes a center portion, which may form the support surface, and an outer portion, which may be curved to provide surface contact with an inner perimeter of the housing. The support indentation can be formed as a recess in the center portion.

An interior curb portion having a larger inner diameter can be formed in the through-hole of the housing to support the rotor support, which may be inserted from the other side of the through-hole. Here, the stopper can be interposed between the interior curb portion and the rotor support.

The motor can further include a bearing between the shaft and the housing, in which case the stopper can be interposed between the bearing and the rotor support.

The base can be a flat element, including a flange-like housing support portion that is being in surface contact with an outer perimeter of the housing.

In certain embodiments, the motor can further include a thrust washer inserted in the support indentation of the rotor support and interposed between the shaft and the rotor support.

In certain embodiments, at least one of the base, the housing, and the rotor support can be press-formed.

Additional aspects and advantages of the present invention will be set forth in part in the description which follows, and in part will be obvious from the description, or may be learned by practice of the invention.

DETAILED DESCRIPTION

Certain embodiments of the invention will be described below in more detail with reference to the accompanying drawings.

Figure 1:
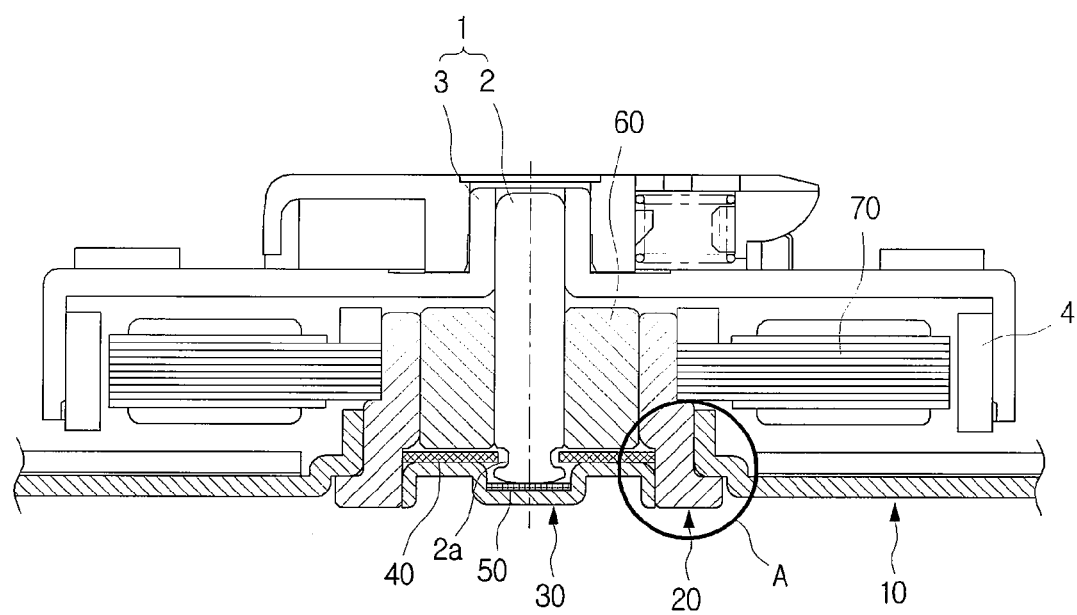
FIG. 1 is a cross-sectional view of a motor according to an embodiment of the invention.
Figure 2:
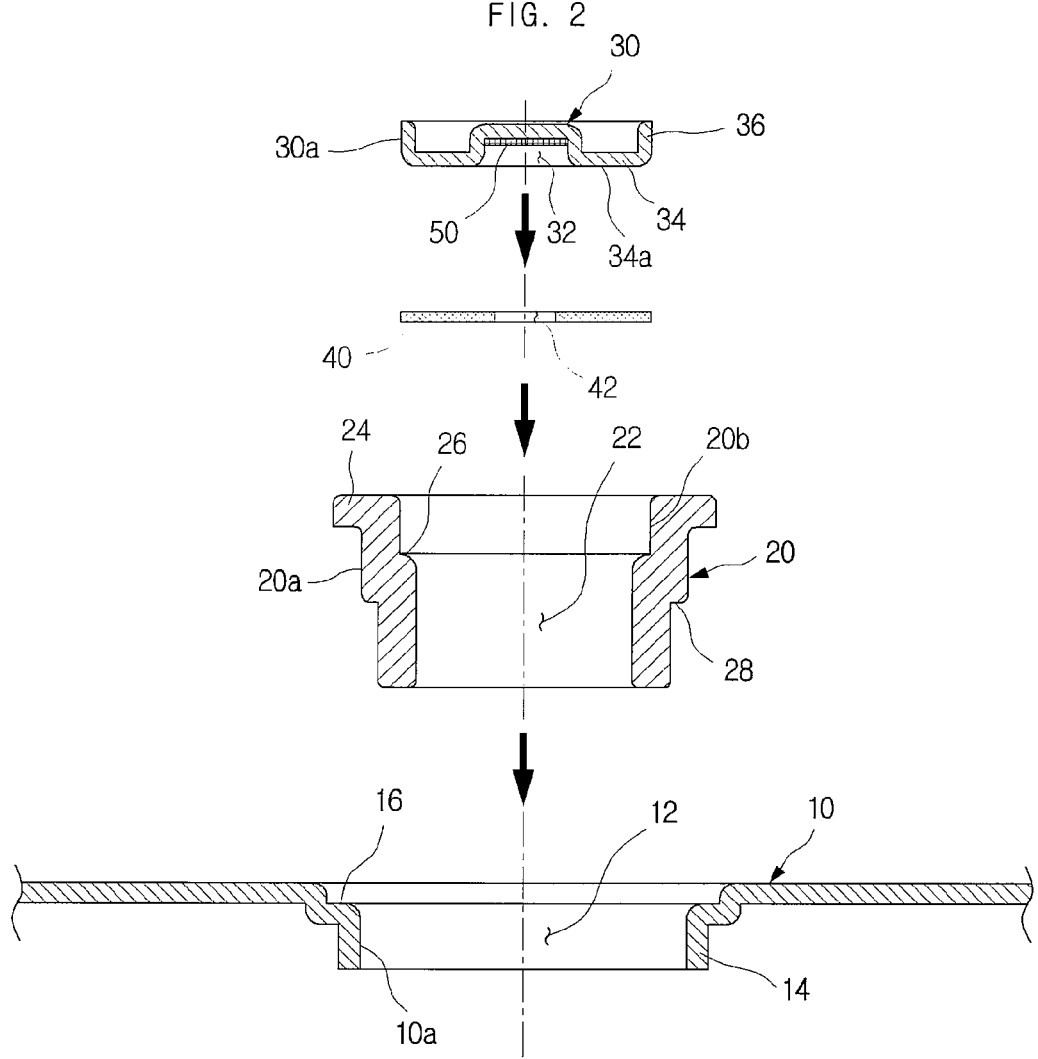
FIG. 2 is an exploded view of a stator in a motor according to an embodiment of the invention.
Figure 3:
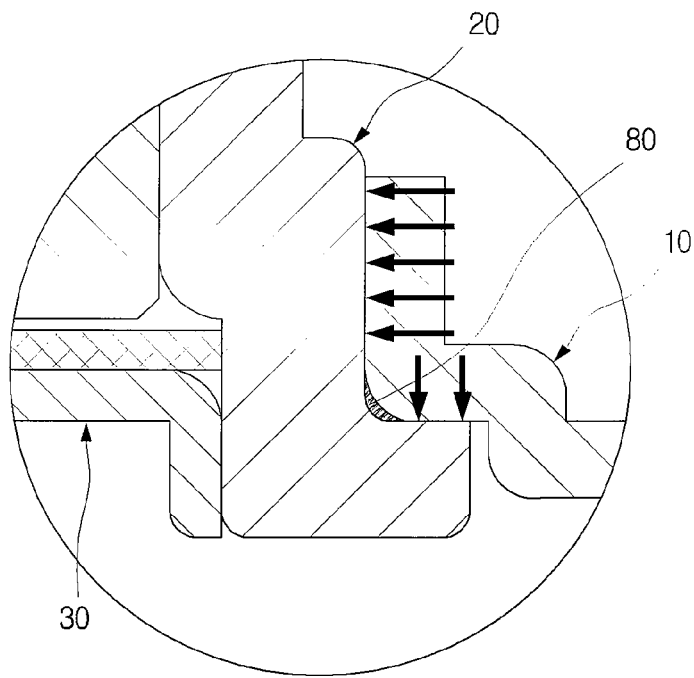
FIG. 3 is a magnified view illustrating how a housing is coupled in a motor according to an embodiment of the invention.

FIG. 1 is a cross-sectional view of a motor according to an embodiment of the invention. FIG. 2 is an exploded view of a stator in a motor according to an embodiment of the invention, and FIG. 3 is a magnified view illustrating how a housing is coupled in a motor according to an embodiment of the invention. FIG. 3 provides a magnified view of portion A in FIG. 1.

A motor according to an embodiment of the invention may include a rotor 1, a base 10, a housing 20, and a rotor support 30. The base 10, the housing 20, and the rotor support 30 may be included as parts of the stator, which supports the rotation of the rotor 1.

The rotor 1 is the part that rotates, and can include a shaft 2 that serves as the central axis of the rotation.

As illustrated in FIG. 1, the rotor 1 of this embodiment may include the shaft 2, and a hub 3 that is coupled to the shaft 2 to support the rotating body. A permanent magnet 4, which may be arranged in correspondence with an electromagnet 70 equipped on the stator, may be coupled to the hub 3. The permanent magnet 4, together with the electromagnet 70, may generate the driving force that rotates the rotor 1.

The base 10 is the part that generally supports the motor, and in certain examples, the base 10 may support the housing 20, which in turn may support the rotor 1. Accordingly, a housing hole 12, through which the housing 20 can be inserted, may be formed in the base 10. Also, a housing support portion 14 for supporting the housing 20 may protrude along the periphery of the housing hole 12.

Here, the base 10 can be a flat element. Using a press forming process, such as burring, etc., a housing support portion 14 shaped as a curved flange can be formed on the plate-like base 10 such that the housing support portion 14 is kept in surface contact with the outer perimeter of the housing 20.

Also, a base curb portion 16, which has an increased inner diameter, can be formed in the base 10 to hold the flange 24 of the housing 20, which will be described later in more detail. The base curb portion 16 can be formed by a press forming process, such as expanding, etc.

As illustrated in FIG. 2, a flange-like housing support portion 14 may be formed on the base 10 according to this embodiment. The housing support portion 14 shaped as a flange may be curved such that the housing support portion 14 protrudes towards one side of the base 10. Also, a base curb portion 16 may be formed in the housing hole 12, towards the other side of the base 10. This particular embodiment presents a housing support portion 14 that surrounds and supports the outer perimeter of the housing 20. However, the invention is not thus limited, and housing support portion 14 can be implemented in various forms that are capable of partially supporting the outer perimeter of the housing 20.

The housing 20 may be coupled to the rotor support 30, which will be described later in more detail, to rotatably support the rotor 1. To this end, the housing 20 may be inserted in the housing hole 12 of the base 10 to be supported by the housing support portion 14, as illustrated in FIG. 1.

Here, the outer perimeter 20a of the housing 20 and the inner perimeter 10a of the housing support portion 14 can have a fit tolerance, so that the housing 20 may be coupled to the base 10 by a press fit, as illustrated in FIG. 2.

Also, in order to securely couple the housing 20 to the base 10, a flange 24 can be formed on the housing 20, with the flange 24 placed in contact with the other side of the base 10. As illustrated in FIG. 3, the housing 20 on which the flange 24 is formed may be supported by the housing support portion 14 and the other side of the base 10. Thus, the housing 20 coupled to the base 10 can be effectively prevented from tilting, whereby tilting can be prevented also for the shaft of the rotor 1 supported by the housing 20. The flange 24 can be formed using a press forming process, such as flanging, etc. This particular embodiment presents a flange 24 that has an annular shape formed along the outer perimeter of the housing 20. However, the invention is not thus limited, and the flange 24 can be implemented in various forms, such as in the form of partially protruding portions formed along the outer perimeter of the housing 20.

Furthermore, to securely couple the housing 20 to the base 10, an adhesive 80 can be applied between the housing 20 and the base 10. In this embodiment, as illustrated in FIG. 3, a space, in which the adhesive 80 may readily be applied, may be formed between the flange 24 and the base curb portion 16.

Also, a through-hole 22 may be formed in the housing 20. The shaft 2 of the rotor 1 may be inserted in one side of the through-hole 22, so that the housing 20 may support the shaft 2.

As illustrated in FIG. 1, a bearing 60 can be interposed between the shaft 2 and the housing 20, to facilitate the rotation of the shaft 2. In this case, the housing 20, which is shaped as a tube, may facilitate the sizing operation for modifying the inner diameter of the bearing 60. Since the inner diameter is decreased as the bearing 60 is pressed into the housing 20, a sizing operation of modifying the inner diameter by inserting a sizing rod may be required. With the housing 20 shaped as a tube, the sizing rod for modifying the inner diameter of the bearing 60 can be inserted more easily.

An interior curb portion 26 having an increased inner diameter can be formed in the through-hole 22, so that the rotor support 30 may be supported. The interior curb portion 26 can be formed by a press forming process, such as expanding, etc.

In this embodiment, an exterior curb portion 28 having a decreased outer diameter can be formed on the outer perimeter of the housing 20, enabling the housing 20 to support the electromagnet 70. The exterior curb portion 28 can be formed by a press forming process, such as necking, etc.

The rotor support 30 may be coupled with the housing 20 to rotatably support the rotor 1, and may include a support indentation 32 that supports the shaft 2 of the rotor 1. As illustrated in FIG. 1, the rotor support 30 may be inserted in the other side of the through-hole 22 of the housing 20, to be coupled with the housing 20.

As illustrated in FIG. 2, the outer perimeter 30a of the rotor support 30 and the inner perimeter 20b of the housing 20 can have a fit tolerance, so that the rotor support 30 may be coupled to the housing 20 by a press fit.

To prevent the shaft 2 from becoming detached, the motor according to this embodiment can further include a stopper 40 coupled to an indentation 2a in the shaft 2. The stopper 40 in this particular embodiment may be shaped as a flat element having a coupling hole 42 and may be fitted onto the shaft indentation 2a. As the rotor 1 rotates and begins to rise, the stopper 40, supported by the stator, can prevent the rotor 1 from becoming detached.

As illustrated in FIG. 2, a support surface 34a, on which the stopper 40 may be placed, can be formed on the rotor support 30, along the periphery of the support indentation 32.

In particular, the rotor support 30 can be made as a single integrated piece. To be more specific, the rotor support 30 can be a flat element that includes a center portion 34, which may form the support surface 34a, and an outer portion 36, which may be curved to provide surface contact with the inner perimeter of the housing 20. The support indentation 32 can be formed as a recess in the center portion 34. In this case, the rotor support 30 can be formed by a press forming process, such as coining, drawing, etc.

As shown in FIG. 1, the stopper 40 can be supported by being interposed between the interior curb portion 26 of the housing 20 and the rotor support 30, described above.

Also, as shown in FIG. 1, the stopper 40 can be supported by being interposed between the bearing 60 and the rotor support 30, described above. To reduce the amount of heat and the degree of resistance created by the friction between the shaft 2 and the rotor support 30, the motor according to this embodiment can further include a thrust washer 50 between the shaft 2 and the rotor support 30. As illustrated in FIG. 1, the thrust washer 50 may be inserted in the support indentation 32 of the rotor support 30.

As described above, the base 10, housing 20, and rotor support 30 of a motor according to an embodiment of the invention can be formed by press forming, and can be coupled together sequentially by press-fitting. Thus, the procedures for processing and assembly can be simplified, and manufacturing costs can be reduced. The structure implemented by press forming and press-fitting also provides high precision in its specifications. Accordingly, various materials can be employed for the components of the motor, without having to use expensive materials, such as brass, etc.

Also, as the housing 20 may be firmly secured to the base 10, the motor according to this embodiment may provide a stable shaft system, in which the shaft is prevented from tilting.

The motor may also provide the advantage of easy height adjustment, for an increased degree of freedom in design.

Figure 4:
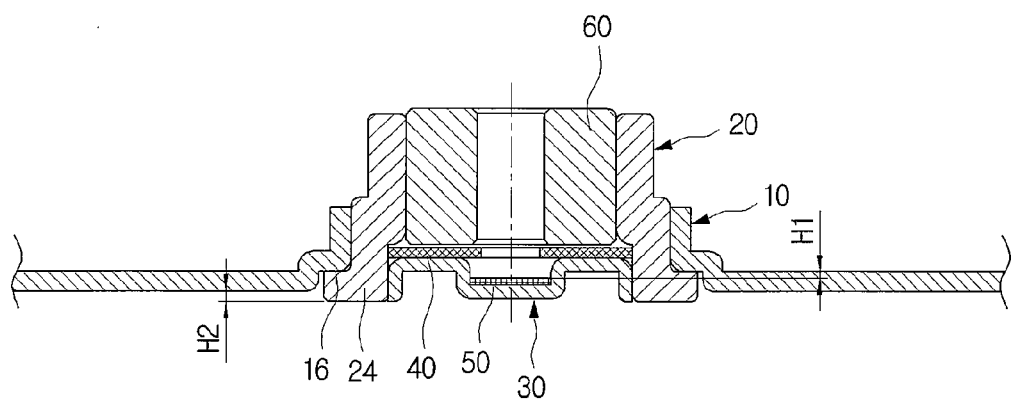
FIG. 4 and FIG. 5 are cross-sectional views illustrating height adjustments in a motor according to an embodiment of the invention.
Figure 5:
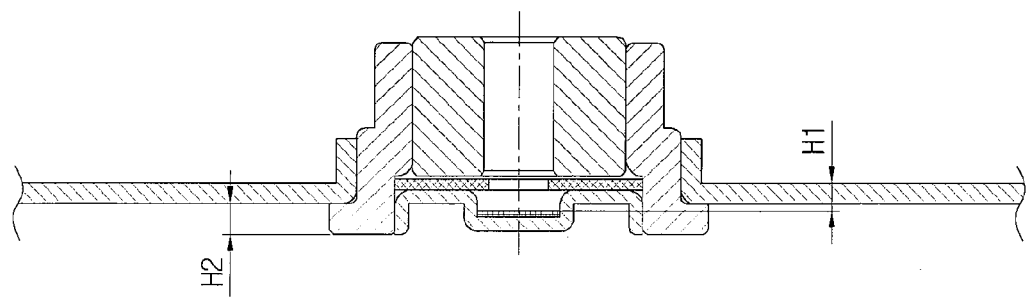

FIG. 4 and FIG. 5 are cross-sectional views illustrating height adjustments in a motor according to an embodiment of the invention.

As illustrated in FIG. 4 and FIG. 5, the mounted height H1 of the shaft 2 in relation to the base 10 can be adjusted by adjusting the depth to which the rotor support 30 is pressed. In this way, the height of the rotor 1 with respect to the base 10 may readily be adjusted.

Also, the protrusion height H2 of the housing 20 from the base 10 can be adjusted, using the base curb portion 16. Thus, by adjusting the mounted height H1 of the shaft 2 and the protrusion height H2 of the housing 20, the overall height of the motor may readily be adjusted.

As set forth above, certain aspects of the invention provide a motor that can be assembled by sequentially fitting components formed by press forming, whereby the manufacturing process of the motor can be simplified, and manufacturing costs can be reduced.

Certain aspects of the invention provide a motor in which the housing that supports the rotor is firmly secured, so that the shaft of the motor can be prevented from tilting.

Also, certain aspects of the invention include a tube-shaped housing by which the sizing operation for the inner diameter of the bearing inserted in the housing may be facilitated.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

Many embodiments other than those set forth above can be found in the appended claims.

What is claimed is:

1. A motor comprising:
a rotor and an electromagnet having a shaft;
a base having a housing hole formed therein and comprising a housing support portion protruding along a periphery of the housing hole;
a housing inserted in the housing hole and supported by the housing support portion, the housing having a through-hole formed therein, the shaft inserted in one side of the through-hole;
a rotor support inserted into the other side of the through-hole and having a support indentation formed therein, the support indentation rotatably supporting the shaft; and
a bearing interposed between the shaft and the housing, wherein:
the housing hole includes a base curb portion, the base curb portion having a larger inner diameter than an outer diameter thereof,
the housing comprises:
a flange being in contact with the base curb portion;
an exterior curb portion formed on a perimeter thereof and having a smaller outer diameter than a diameter of the housing hole so as to support the electromagnet; and
an interior curb portion formed in the through-hole and having a larger inner diameter than a diameter of the through-hole so as to support the rotor support inserted into the other side of the through-hole,
the housing and the housing support portion have a fit tolerance, and
the housing is coupled to the base curb portion of the base by a press fit.

2. The motor according to claim 1, wherein an adhesive is interposed between the housing and the base.

3. The motor according to claim 1, wherein:
the rotor support and the through-hole in the housing have a fit tolerance; and
the rotor support is coupled to the housing by a press fit.

4. The motor according to claim 3, wherein:
the rotor support includes a support surface formed along a periphery of the support indentation; and
the motor further comprises a stopper resting on the support surface and coupled to the shaft so as to prevent the shaft from becoming detached.

5. The motor according to claim 4, wherein:
the rotor support is a flat element, the flat element comprising:
a center portion forming the support surface; and
an outer portion curved to provide surface contact with an inner perimeter of the housing; and
the support indentation is formed as a recess in the center portion.

6. The motor according to claim 4, wherein:
the stopper is interposed between the interior curb portion and the rotor support.

7. The motor according to claim 4,
wherein the stopper is interposed between the bearing and the rotor support.

8. The motor according to claim 1, further comprising a thrust washer inserted in the support indentation of the rotor support and interposed between the shaft and the rotor support.

9. The motor according to claim 1, wherein at least one of the base, the housing, and the rotor support is press-formed.

* * * * *